Aug. 25, 1959 E. S. TUPPER 2,900,656
CLEANING, SCRAPING AND MIXING IMPLEMENT
Filed Jan. 24, 1955 3 Sheets-Sheet 1
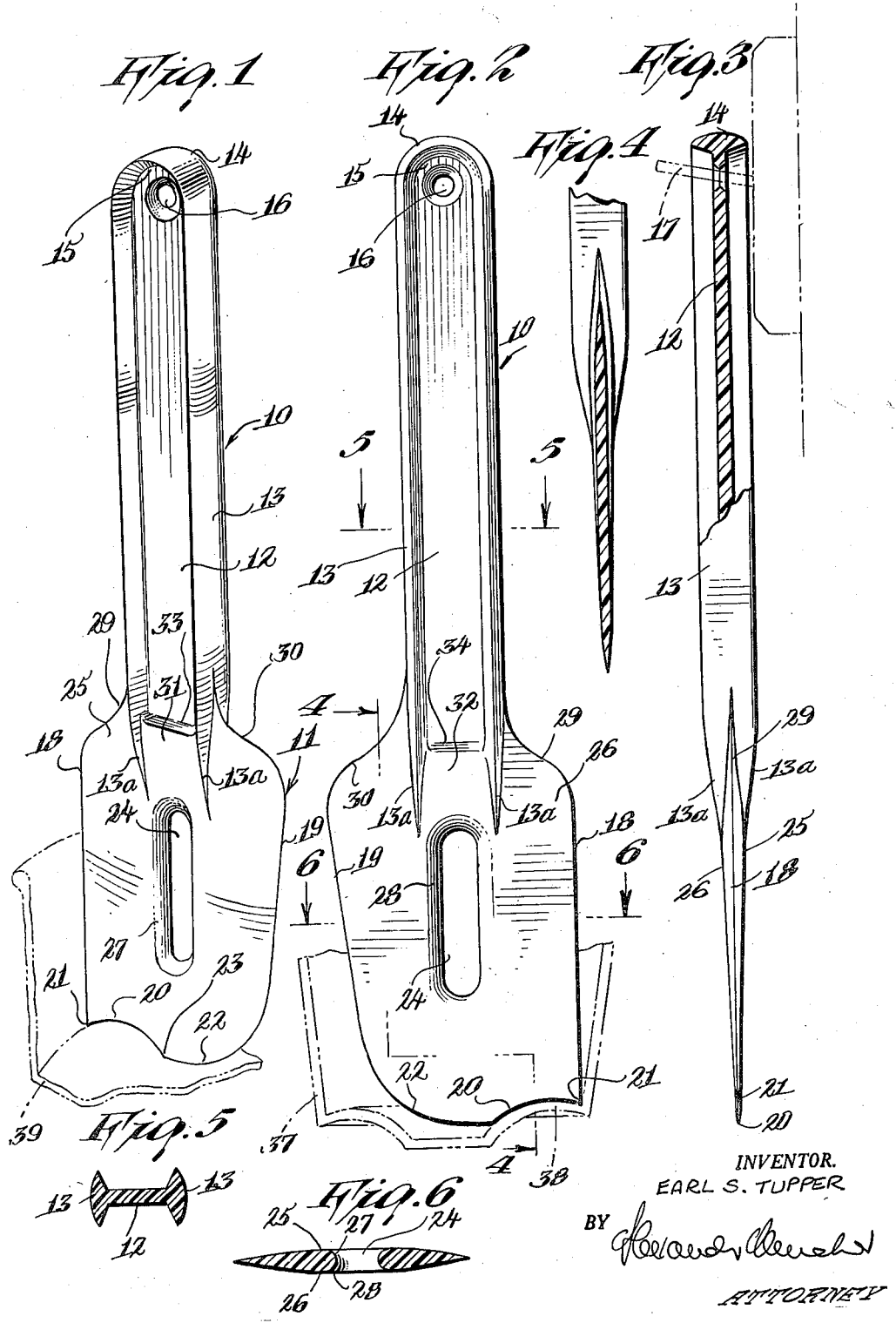
INVENTOR.
EARL S. TUPPER

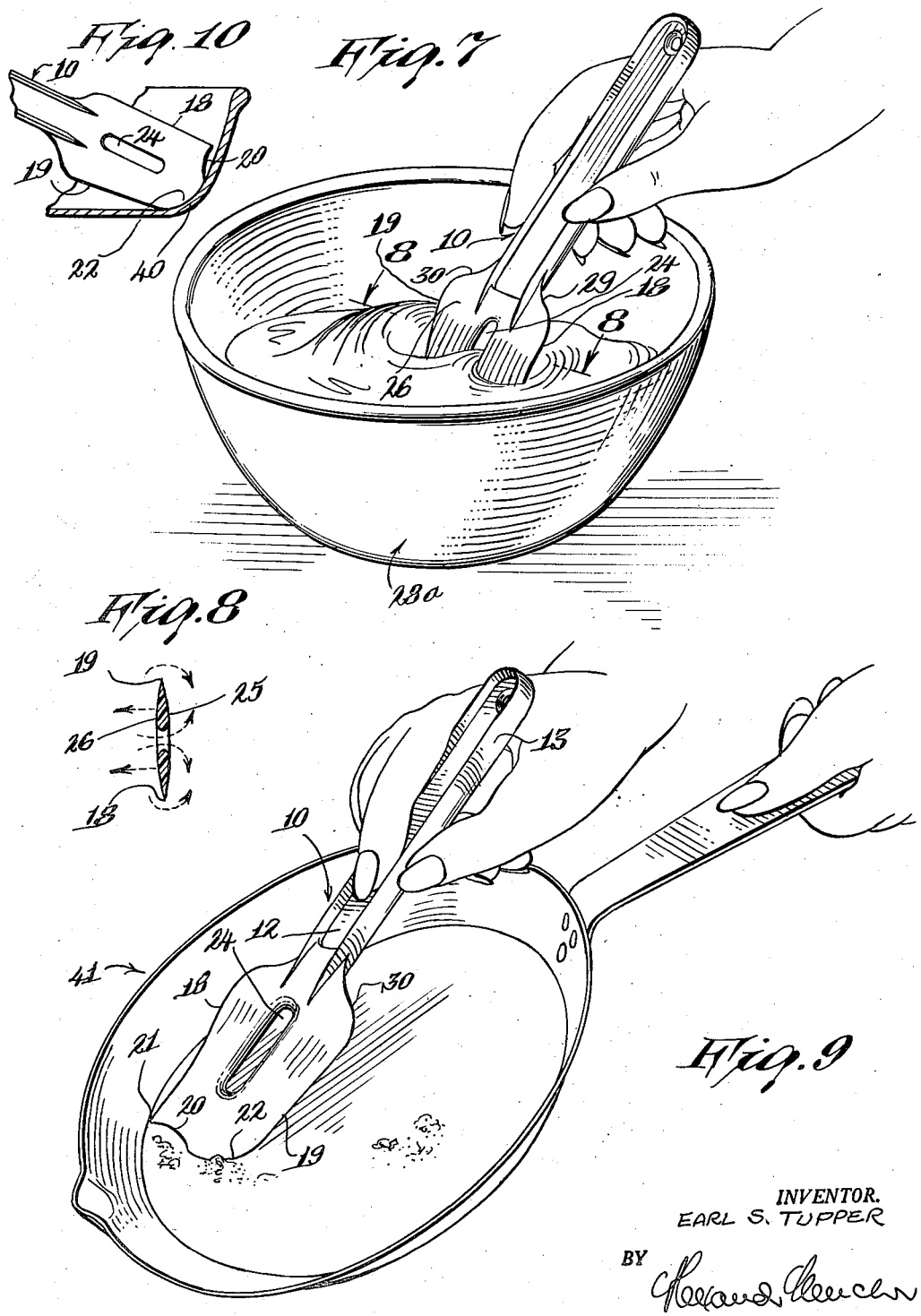

Aug. 25, 1959 — E. S. TUPPER — 2,900,656
CLEANING, SCRAPING AND MIXING IMPLEMENT
Filed Jan. 24, 1955 — 3 Sheets-Sheet 3
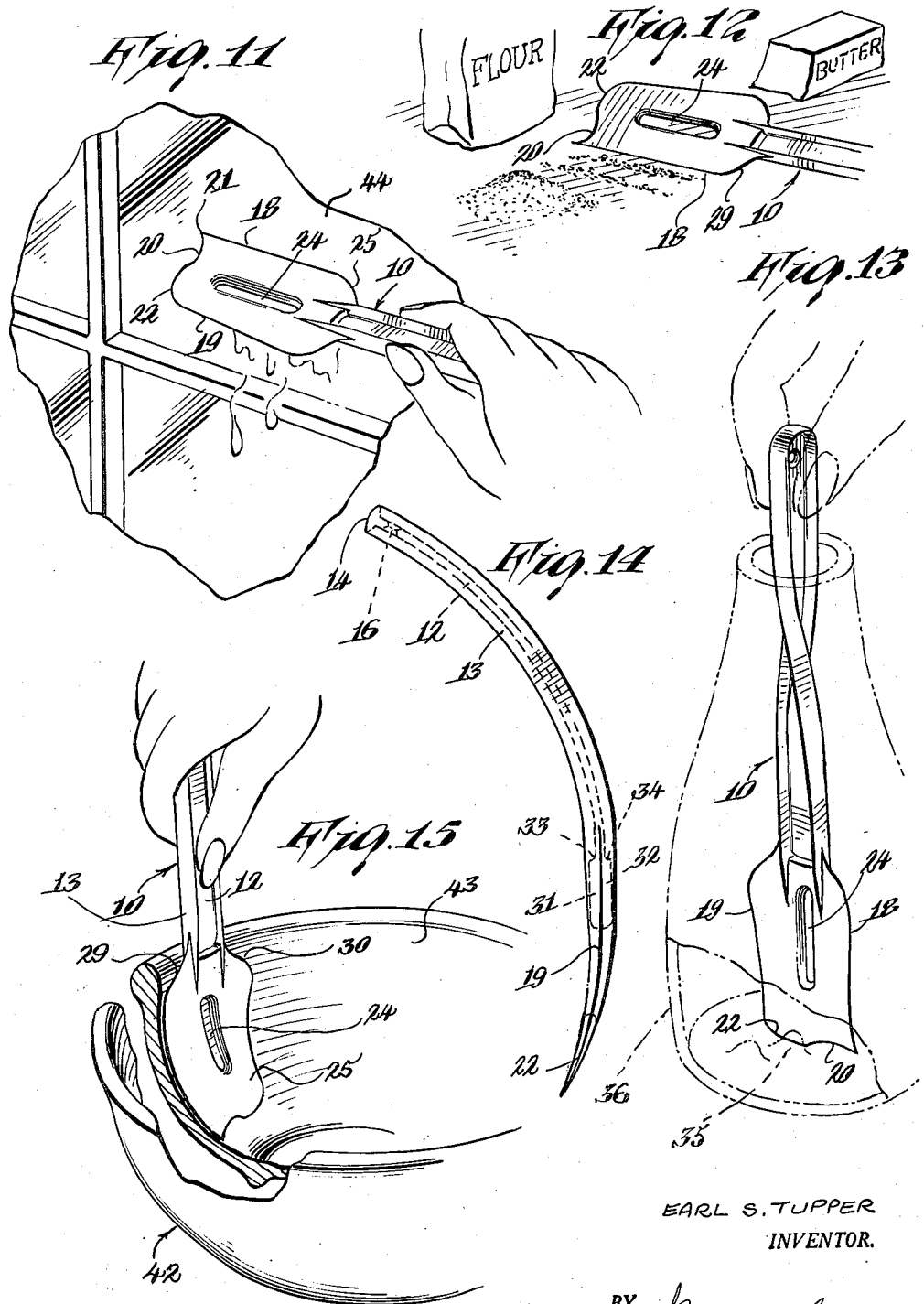
EARL S. TUPPER
INVENTOR.

United States Patent Office 2,900,656
Patented Aug. 25, 1959

2,900,656

CLEANING, SCRAPING AND MIXING IMPLEMENT

Earl S. Tupper, Upton, Mass., assignor to Tupper Corporation, North Smithfield, R.I., a corporation of Delaware Application January 24, 1955, Serial No. 483,477

1 Claim. (Cl. 15—245)

This invention relates generally to an all-purpose mixing, beating, scraping and squeegee implement, but more specifically to a blade and handle formed of a sterile and thermoplastic material and having various operating surfaces, edges and distortable forms for mixing, beating, scraping, cleaning and surface removal of ingredients or substances in vessels or otherwise and applicable to domestic, consumer, industrial and commercial purposes.

The invention may specifically relate to a mixing or beating blade for ingredients in vessels of any shape wherein the blade member is subject to local and differential deformation at separate and remote pressure areas, the blade having differential thickness and having various curves on reduced or sharp edges thereof for yieldability and conformation for mixing, beating and reclaiming the ingredients in the receiving vessel. The invention may further relate to a scraping or cleaning blade applied to articles of furniture or otherwise and wherein the device may also operate as a squeegee implement.

A main object of the invention resides in the provision of a plastic blade provided with a handle and of the above characteristics, the device being formed integrally and being capable of differential deformation along specified areas during use so that the device becomes shape conforming with pressure on the handle; so that the device will not subject the vessel or other receiving object to breakage, scratching or fracture; and so that the grip on the handle by the operator will not result in undue skin pressure so as to cause blistering.

A further object of the invention resides in the provision of a blade capable of torsion along the longitudinal axis and which includes an elongated and integrally formed handle of relatively less pressure-sensitivity or deformability than the blade parts. The differential handle and blade or head deformation takes place in accordance with imposed pressures induced by the operator and in accordance with the interior shape of the bottle or vessel containing contents to be operated upon, or the exterior shape of an object operated upon.

A further feature of the invention resides in the provision of a mixing blade of the above characteristics wherein the head or blade portion along its edges may be used for scraping or squeegeeing interior walls of vessels for removing the final contents thereof after beating or mixing with the device.

Another feature of the invention resides in the provision of an instrument of thermoplastic material such as polyethylene or other substance having similar physical characteristics including treated styrenes, vinyls and derivatives. The said characteristics of the material include local deformability with resiliency, capacity to withstand and yield to shock without breakage or fracture, and softness to avoid scratching of the surfaces operated upon. In addition the material used is non-absorptive to and is not readily wetted by water, is odorless, resistant and inert to acids, alkalis, solvents and other chemicals at ordinary temperatures, is sanitary and easy to keep clean. Moreover, the material does not soften far below the boiling point of water and is resistant to mildews, microorganisms and insects. Furthermore, the implement is capable of assuming different contours for shape conformation so that undue pressure against the walls of a vessel or any surface is capable of absorption whereby no fracture or scratching occurs and whereby no jarring is transmitted to the hands of the operator.

A further object of the invention resides in the provision of an implement for commercial, industrial, domestic and consumer use which is strong, durable, resistant to wear, tear, shocks of handling and impact, is electrically non-conductive, is a non-conductor of heat and is capable of repeated use without wearing out or losing its characteristics.

These objects and other incidental ends and advantages of the invention will hereinafter appear in the progress of the disclosure and as pointed out in the appended claim.

Accompanying this specification are drawings showing a preferred form of the invention wherein:

Figure 1 is a perspective vew of a preferred embodiment of the present invention the blade being used with one edge against the inner surface of a side wall of a vessel shown in phantom.

Figure 2 is a front view in elevation showing the invention and wherein the blade or head at a curved edge is in line contact with a corresponding curved portion of a vessel inner surface for scraping or squeegeeing the remains of the contents after a mixing or beat operation, said vessel portion being shown in phantom.

Figure 3 is an end view in elevation partly in section showing the device in hanging or storage position.

Figure 4 is a fragmentary and sectional view of Figure 2 across the plane 4—4 thereof.

Figure 5 is a sectional view of Figure 2 across the plane 5—5 thereof.

Figure 6 is a sectional view of the head or blade portion of Figure 2 across the plane 6—6 thereof.

Figure 7 is a view in perspective showing the device as used inside of a bowl for beating or mixing purposes.

Figure 8 is a sectional view of Figure 7 across the plane 8—8 thereof showing how intimate mixture of vessel contents is effected.

Figure 9 is a view in perspective showing the device as a scraping blade for removing content remains on a cooking utensil.

Figure 10 is a fragmentary view in perspective partly in section showing a rounded edge of the blade used for scraping the contents of a vessel at a rounded area.

Figure 11 is a fragmentary view in perspective showing use of the device as a squeegee in conjunction with a pane of glass.

Figure 12 is a fragmentary view in perspective showing use of the device as a blender for cooking or baking.

Figure 13 is a view in perspective showing the device in torsion as a result of blocked movement.

Figure 14 is a curved axial view in elevation of the device showing differential deformation about an intermediate thickened portion.

Figure 15 is a view in perspective showing the head or blade of the device conforming to the curvature of a vessel for required pressure as for blending or comminution.

In accordance with the invention and the preferred form shown, the implement is comprised of a handle generally indicated by numeral 10 and an integrally formed head or blade generally indicated by numeral 11. Handle 10 as shown is formed of an elongated and reinforced member shown in the form of an I-beam having the web 12 and peripheral edge 13 preferably in the form of a convex lens running therearound. Edge 13 gives the handle member increased rigidity against local deformability about horizontal axes and creates a substantial amount of rigidity against flexing about the vertical axis. It is to be noted that the top of edge 13 is rounded as at 14 to conform with the rounded portion 15 of handle 10 and that there may be a countersunk opening 16 adjacent and below handle top 14 for purposes of hanging the device on a nail or hook 17 applied on a wall.

The head or blade member 11 of the device is integrally formed with handle 10 at the lower end and preferably has a tapering cross-sectional shape along both axes somewhat similar to a convex lens as best indicated in Figures 4 and 6 whereby the peripheral side wall comes to relatively sharp edges. Thus, the blade 11 has a straight vertical edge 18, an opposite, downwardly and inwardly inclined edge 19, a bottom concave edge portion 20 meeting the straight vertical edge 18 preferably at a point 21, and a convexly curved bottom edge portion 22 joining the concave bottom edge 20 as shown in a point 23 and the downwardly and inclined edge 19 in a curve. Although edges 19 and 22 join along a curve, modifications thereof may be made; while edges 22 and 20 although joining each other in the point 23 may join in a curve.

Along the vertical axis of head or blade 11 and coinciding with the axis elongation of handle 10 is a vertically extending, elongated, narrow and intermediate slot or opening 24 joining the front blade face 25 and the rear blade face 26 in peripheral rounded portions 27 and 28 respectively, said slot being provided with rounded top and bottom walls so that when blade 11 is used as a mixing or beating implement as shown in Figure 7 there is a minimum of resistance to flow therethrough of contents of bowl 28a, the directions of flow of the contents during the mixing or beating operation being indicated by the curved arrows in Figure 8 when the blade is moved in the opposite direction to such curved arrows as indicated by the straight arrows.

Edge 13 of handle 10 joins the blade member 11 intermediate the edge width, such width being reduced to tapered portions 13a. Thus, blade edges 18 and 19 join and merge with edges 13 intermediate the width thereof at curved edge portions 29 and 30.

On each face 25 and 26 of blade member 11 and intermediate the reduced edges 13a is a thickened portion such as 31 and 32 forming a step 33 and a step 34 with respect to the web portion 12 of handle 10. These thickened portions 31 and 32 at the junction between handle web 12 and the top of blade 11 serve as a fulcrum about which handle 10 and blade member 11 deform as best shown in Figure 14, the handle 10 being also locally deformable and flexible above these thickened portions 31 and 32, and the blade 11 being locally deformable below these thickened portions as shown in Figure 14 and Figure 15.

The device is integrally formed of a thermoplastic material including polyethylene, treated styrenes, vinyls and derivatives thereof and may be formed by any of the known forming processes including injection, compression and blow molding and also vacuum forming. Because of the shape of the elements of the device, molding is indeed expeditious. And by virtue of the nature of the material of the device, handle 10 is capable of independent torsional movement above the thickened portions 31 and 32 when and in the event that the blade member 11 hits an obstruction 35 at the bottom of a vessel 36 as shown in Figure 13. Here the blade 11 is under slight torsion about the vertical axis, said torsion being accommodated by slot 24.

As shown in Figure 2, a vessel 37 has a bottom formation in the form of a peripheral convex curved surface 38 in which the blade bottom convex edge 20 portion conforms by line contact whereby material may be scraped therefrom for removal purposes. Point 21 functions to go into the corner between the side wall of the vessel 37 and the curved portion 38. Of course the edges may be used for ordinary cleaning purposes, or for removing the contents of a vessel after a beating or mixing operation thereon.

As shown in Figure 1, the straight edge 18 is capable of scraping and forming line contact with the inner side wall of a vessel 39. The convex bottom edge portion 22 as shown in Figure 10 is adapted to engage a curvilinear peripheral portion 40 of a utensil as shown in Figure 10 while Figure 9 shows the blade point 21 used to clean a pan 41 at the junction between the bottom and side walls thereof.

In Figure 15 a bowl generally indicated by numeral 42 and having a curvilinear side wall 43 shows the blade 11 pressed thereagainst along the side wall 26 and shows the shape conformation for purposes of comminution, blending or compression of the bowl contents. In this connection, the slot 24 contributes to deformability by relieving internal stresses and strains in blade 11. Moreover, web 12 of handle 10 makes a comfortable flat and channel type of thumb rest for pressure imposition while the handle is held during operation.

Figure 12 shows the device as a blending implement such as for butter and flour during baking wherein the straight edge 18 may be used for cutting a portion of butter, for rough measurement and for scraping transportation of flour thereto and for mechanical mixture of the ingredients. Figure 11 shows the device capable of use as a squeegeeing implement in conjunction with a glass pane 44. In this connection point 21 may serve as a corner squeegee element.

The device described is capable of use internally and externally of vessel and is also useful as a device for getting at dirt in fluted, rounded and other irregularly shaped conformations. Moreover, the general structure is devoid of inaccessible recesses so that the implement itself may be maintained in a sterile and clean condition.

By virtue of the tapered faces 25 and 26 of the blade, the peripheral edges of head 11 in themselves are locally deformable so that breakage or scratching of materials operated upon is eliminated. In addition, the structural elements of the device cause a self shape-retaining characteristic and the rounded faces of handle edge 13 offers a comfortable grasping surface to the hands of the operator. Certainly the operator's hand cannot be blistered or in any way infected by virtue of the nature of the material from which the implement is made and the smooth and rounded grasping surfaces of the handle elements.

It is to be noted that the relatively sharp blade edge portions are more pressure sensitive for deformability than the remaining blade area and therefore differential deformability takes place throughout the parts of the implement on application of pressure to any part.

The implement is capable of use in domestic fields, in the kitchen as described, and also in industrial, commercial, and medical fields by virtue of the fact that the thermoplastic material from which the device is formed is extremely inert to physical and chemical combination and the device structure is capable of various applications. The device has application further in the cheese field.

The implement normally is straight and flat when hung on a wall or placed in a cabinet drawer taking up a minimum of space.

Thus, the device as described in a preferred form is light in weight, takes up little room, may be carried on the person (by reduction in size), is safe to handle for all suitable purposes even other than those described and can be considered as a general utility instrument or as a specialized instrument. In the medical field, it may be used as a tongue depressor and even as a spacing implement. In the laboratory, the device is capable of being used as a pestle or as a scraping instrument where static charges are to be avoided as in dealing with explosives and volatile solvents, and a blender blade.

I wish it understood that minor changes and variations in the material, location, integration, relative size and shape of parts of the invention may all be resorted to without departing from the spirit of the invention and the scope of the appended claim.

I claim:

A cleaning, scraping and mixing implement formed of polyethylene and comprising an elongated, straight and flat handle portion, a reinforcing conformation formed with said handle portion along the longitudinal edges and the outer end edge thereof to prevent bending across the longitudinal axis of said handle portion, a substantially flat blade formed integral with and carried by the inner end of said handle portion and coaxial with the longitudinal axis thereof, a second reinforcing conformation at the junction between the blade and inner end of said handle portion whereby said second reinforcing conformation serves to act as a fulcrum area for deformation of the blade and for torsion of the handle portion, said blade having a slot intermediate the length thereof and coaxial with the handle portion longitudinal axis to aid torsional and deformable characteristics of the blade member and also to permit penetration therethrough when said blade member is used as a mixing and heating implement, the faces of said blade tapering toward each other, the blade having a relatively thin edge along the perimeter, said edge having straight and curved portions, said edge portions being more pressure sensitive for deformability then the rest of the blade.

References Cited in the file of this patent

UNITED STATES PATENTS

| | | |
|---|---|---|
| 1,211,098 | Darrin | Jan. 2, 1917 |
| 1,460,007 | Williams | June 26, 1923 |
| 1,498,155 | Dorr | June 17, 1924 |
| 2,046,334 | Loeber | July 7, 1936 |
| 2,046,599 | Andrews | July 7, 1936 |
| 2,065,886 | Clift | Dec. 29, 1936 |
| 2,188,144 | Hubbard | Jan. 23, 1940 |
| 2,280,225 | Finely | Apr. 21, 1942 |
| 2,524,116 | Rein | Oct. 3, 1950 |
| 2,563,940 | Krasberg | Aug. 14, 1951 |
| 2,658,730 | Mignolet | Nov. 10, 1953 |
| 2,719,316 | Houser | Oct. 4, 1955 |
| 2,752,623 | Tupper | July 3, 1956 |
| 2,828,502 | Tupper | Apr. 1, 1958 |